United States Patent
Grillet (10) Patent No.: US 10,618,769 B2
(45) Date of Patent: Apr. 14, 2020

(54) DEVICE AND METHOD FOR WINDING AN EXCESS LENGTH OF AN OPTICAL FIBER ONTO A BOBBIN

(71) Applicant: Conductix Wampfler France, Colombes (FR)

(72) Inventor: Michel Grillet, La Motte Servolex (FR)

(73) Assignee: CONDUCTIX WAMPFLER FRANCE, Colombes (FR)

( * ) Notice: Subject to any disclaimer, the term of this patent is extended or adjusted under 35 U.S.C. 154(b) by 100 days.

(21) Appl. No.: 15/569,295

(22) PCT Filed: Apr. 29, 2016

(86) PCT No.: PCT/FR2016/051011
§ 371 (c)(1),
(2) Date: Oct. 25, 2017

(87) PCT Pub. No.: WO2016/174368
PCT Pub. Date: Nov. 3, 2016

(65) Prior Publication Data
US 2018/0118503 A1    May 3, 2018

(30) Foreign Application Priority Data
Apr. 29, 2015 (FR) ..................... 15 53843

(51) Int. Cl.
*B65H 54/34* (2006.01)
*B65H 65/00* (2006.01)
(Continued)

(52) U.S. Cl.
CPC ......... *B65H 54/343* (2013.01); *B65H 54/346* (2013.01); *B65H 65/00* (2013.01);
(Continued)

(58) Field of Classification Search
CPC .. B65H 54/343; B65H 54/346; B65H 54/547; B65H 75/14; B65H 75/28; B65H 65/00; B65H 2701/32; G02B 6/4457
See application file for complete search history.

(56) References Cited

U.S. PATENT DOCUMENTS

| 4,657,203 A | * | 4/1987 | Crawford | ............... B65H 75/14 |
| | | | | 242/118.4 |
| 5,931,408 A | | 8/1999 | Ishii et al. | |

(Continued)

FOREIGN PATENT DOCUMENTS

| CN | 104276450 A | 1/2015 |
| FR | 2766807 A1 | 2/1999 |

(Continued)

OTHER PUBLICATIONS

International Search Report dated Jul. 20, 2016.
Preliminary Search Report dated Mar. 24, 2016.

*Primary Examiner* — William E Dondero
(74) *Attorney, Agent, or Firm* — Ryan T. Grace; Advent, LLP (57) ABSTRACT

The invention relates to a device (2) for winding an excess length (100') of an optical fibre onto a bobbin (1) comprising:
- a cylindrical reel (10),
- two rims (11, 12) extending radially from each end of the reel (10), one (11) of said rims being provided with a port (110) for the optical fibre,
- a magazine (13) which has a cylindrical surface for receiving a winding of the excess length (100') of the optical fibre, is separated from the reel (10) by the rim (11) provided with the port (110) and has a circumferential edge (130) for retaining the excess length of the optical fibre, the device is characterised in that the same comprises:
(Continued)

means (22) for storing the excess length of the optical fibre, and means (21) for winding the excess length of the optical fibre about the magazine (13), the means (21, 22) being able to cooperate in such a way as to unwind a certain length of the optical fibre stored on the storing means (22) and wind the excess length about the magazine (13).

12 Claims, 5 Drawing Sheets

(51) Int. Cl.
*B65H 75/14* (2006.01)
*B65H 75/28* (2006.01)
*G02B 6/44* (2006.01)
*B65H 54/547* (2006.01)

(52) U.S. Cl.
CPC ............ *B65H 75/14* (2013.01); *B65H 75/28* (2013.01); *G02B 6/4457* (2013.01); *B65H 54/547* (2013.01); *B65H 2701/32* (2013.01)

(56) References Cited

U.S. PATENT DOCUMENTS

| | | | |
|---|---|---|---|
| 6,533,216 B1* | 3/2003 | Bumgarner | B65H 75/14 242/118.41 |
| 9,126,800 B2* | 9/2015 | Penumatcha | B65H 75/14 |
| 9,624,069 B2* | 4/2017 | Hamaguchi | B65H 75/14 |
| 9,745,166 B2* | 8/2017 | Shirako | G02B 6/4457 |
| 9,810,870 B2* | 11/2017 | Akamatsu | B65H 65/00 |
| 2009/0230228 A1* | 9/2009 | Penumatcha | B65H 75/14 242/395 |
| 2013/0075522 A1* | 3/2013 | Penumatcha | B65H 75/14 242/614 |
| 2015/0008275 A1* | 1/2015 | Akamatsu | B65H 65/00 242/476.6 |
| 2015/0203326 A1* | 7/2015 | Hamaguchi | B65H 75/14 242/178 |
| 2016/0167918 A1* | 6/2016 | Shirako | G02B 6/4457 242/476.1 |
| 2019/0016556 A1* | 1/2019 | Akamatsu | B65H 75/285 |

FOREIGN PATENT DOCUMENTS

| | | |
|---|---|---|
| GB | 866403 A | 4/1961 |
| JP | H08327831 A | 12/1996 |
| JP | 2015010031 A | 1/2015 |

* cited by examiner

DEVICE AND METHOD FOR WINDING AN EXCESS LENGTH OF AN OPTICAL FIBER ONTO A BOBBIN

SCOPE OF THE INVENTION

This invention relates to a method for winding an excess length of an optical fibre onto a bobbin, as well as a bobbin adapted to such a winding method.

BACKGROUND OF THE INVENTION

From manufacturing an optical fibre, a certain length of said optical fibre is wound on a bobbin in view of its storage and its transport to a place of use. This length is typically around a few kilometres.

In view of being able to test a sample of optical fibre from said bobbin, it is known to wind an excess length of optical fibre onto a dedicated magazine arranged in the bobbin. This excess length corresponding to a section of the optical fibre first wound onto the bobbin, such a magazine allows making this excess length accessible after winding the whole of the fibre.

Figure 1A:
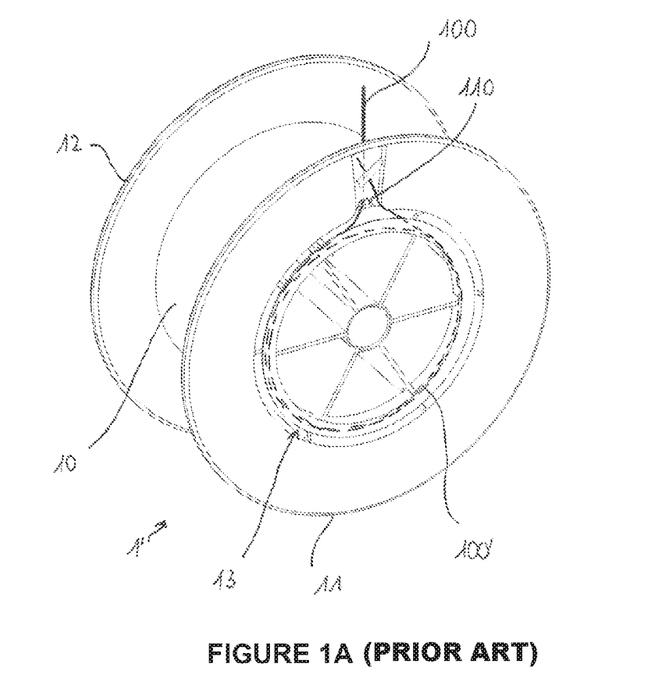
FIG. 1A is a perspective view of a bobbin of a known type.

FIG. 1A is a perspective view of a bobbin 1', of known type, comprising such a magazine.

The bobbin 1' comprises a cylindrical reel 10 to receive the optical fibre, and two rims 11, 12 which extend radially to each end of the reel 10 in order to axially retain the optical fibre wound onto the reel.

One of the two rims (in this case, the rim 11) is provided with a port 110 for the optical fibre 100.

Said rim 11 separates the reel 10 from a cylindrical magazine 13 which is intended to receive an excess length 100' of optical fibre.

Figure 1B:
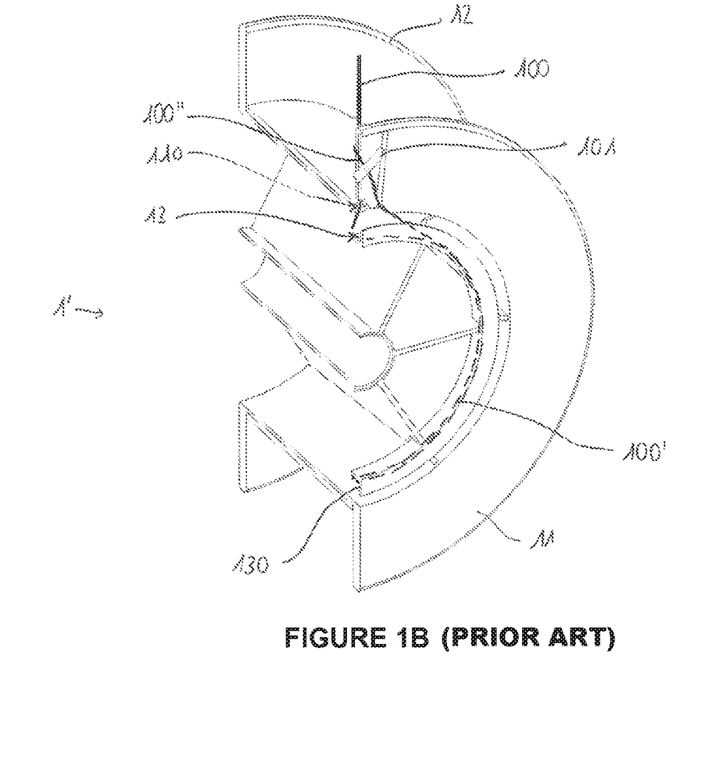
FIG. 1B is a partial cross-section view of the bobbin in FIG. 1A.

As can be best seen in FIG. 1B, the rim has a circumferential edge 130 to axially retain the excess length 100' of optical fibre wound onto the magazine.

To wind an excess length 100' of optical fibre onto the magazine, an operator passes a section 100' of optical fibre of the desired length through the port 110 (from the reel towards the magazine) then manually winds this section of optical fibre onto the magazine 13, behind the circumferential edge 130. Then, to avoid any unintentional unwinding of the optical fibre, he attaches the end 100'' of this onto the rim 11 by means of an adhesive 101.

This manual operation takes a long time and is costly.

The document JP 2015-010031 discloses a method for automatically winding an excess length of optical fibre onto the magazine of a bobbin. To this end, the bobbin is provided with a removable plate which is inserted onto the circumferential edge of the magazine to as to wedge the free end of the optical fibre before it is wound onto the magazine.

However, this method has the disadvantage that the free end of the optical fibre is located on the internal side of the winding (in other words, close to the cylindrical surface), so that the later unwinding of a section of said excess length is difficult to implement without damaging the optical fibre. Furthermore, it requires an additional component to be added to the bobbin to wedge the free end of the optical fibre.

BRIEF DESCRIPTION OF THE INVENTION

An aim of the invention is therefore to design a bobbin intended for the winding of an optical fibre which allows the desired excess length to be wound automatically, and to hold said excess length in place without a manual operation being necessary. Another aim of the invention is to design a device and a method allowing to automatically wind an excess length of optical fibre onto such a bobbin. In particular, the invention must provide access to the excess length of optical fibre, allowing a section of it to be unwound for a later use without exerting force likely to damage the optical fibre.

In accordance with the invention, a bobbin intended for the winding of an optical fibre is proposed, comprising:
- a cylindrical reel intended to receive the optical fibre,
- two rims extending radially from each end of the reel, one of the rims being provided with a port for passage of the optical fibre,
- a magazine that has a cylindrical surface intended to receive a winding of an excess length of optical fibre, said magazine being separated from the reel by the rim provided with the port and having a circumferential edge to retain said excess length of optical fibre, said bobbin being characterised in that said circumferential edge has an opening, and in that the magazine has a rib extending radially over a part of the circumference of the cylindrical surface, set back and partially facing said opening, so as to hold a loop of the excess length of optical fibre between the circumferential edge and the rib.

The distance between the circumferential edge and the rib is typically between 100 µm and 400 µm.

According to an embodiment, the magazine is separate from the reel and connected to said reel.

Alternatively, the whole of the reel, the rims and the magazine is constituted as one single piece.

According to an embodiment, the bobbin comprises an optical fibre wound onto the reel and an excess length of said optical fibre wound onto the magazine, the end of said excess length extending between the rib and the circumferential edge and leading to the opening.

Another aim of the invention relates to a device for winding an excess length of optical fibre onto a bobbin such as defined above, characterised in that it comprises:
- means for storing said excess length of optical fibre in an area located on the side of the rim provided with the port opposite the reel,
- means for winding said excess length of optical fibre about the magazine, said means being able to cooperate to unwind a length of optical fibre stored on the storing means and to wind said excess length about the magazine.

According to a particularly advantageous embodiment, said means comprise two coaxial adjacent discs, each disc comprising respective means for clamping the optical fibre, said device further comprising a robotic arm holding said discs and a device for the respective rotating of each disc independently from the other disc.

According to an embodiment, said device comprises means for aligning the discs in relation to the port of the rim of the bobbin.

The invention also relates to a machine for placing an optical fibre in the bobbin, which comprises a winding device such as defined above.

Another aim of the invention relates to a method for winding an excess length of optical fibre onto a bobbin, characterised in that it comprises:
- providing a bobbin such as defined above and a winding device such as defined above, and positioning the device facing the bobbin,
- inserting the optical fibre through the port of the reel towards the storing means,
- storing the excess length of optical fibre on said storing means, winding, by the winding means, said excess length of optical fibre onto the cylindrical surface of the magazine, on the side of the rib opposite the circumferential edge, the last turn of said excess length being positioned between the rib and the circumferential edge.

According to a preferred embodiment, said method comprises:

positioning the winding device facing the bobbin so that a first disc is adjacent to the magazine, inserting the optical fibre through the port of the reel towards the discs, clamping the end of the optical fibre against the second disc, rotating said second disc in a first direction, the first disc remaining fixed relative to the bobbin, so as to wind an excess length of optical fibre onto the second disc, rotating the two discs in a second direction, opposite to the first direction, the second disc having a rotating speed of more than that of the first disc, so as to wind said excess length of optical fibre onto the magazine, on the side of the rib opposite the circumferential edge, before winding the last turn of said excess length, offsetting the two discs in a direction remote from the bobbin, so as to position the excess length of remaining optical fibre to be wound onto the magazine between the rib and the circumferential edge, further rotating the two discs, so as to wind the last turn of the excess length of optical fibre onto the cylindrical surface of the magazine.

BRIEF DESCRIPTION OF THE DRAWINGS

Other characteristics and advantages of the invention will emerge from the detailed description which will follow, in reference to the appended drawings, whereon.

DETAILED DESCRIPTION OF EMBODIMENTS OF THE INVENTION

Figure 2A:
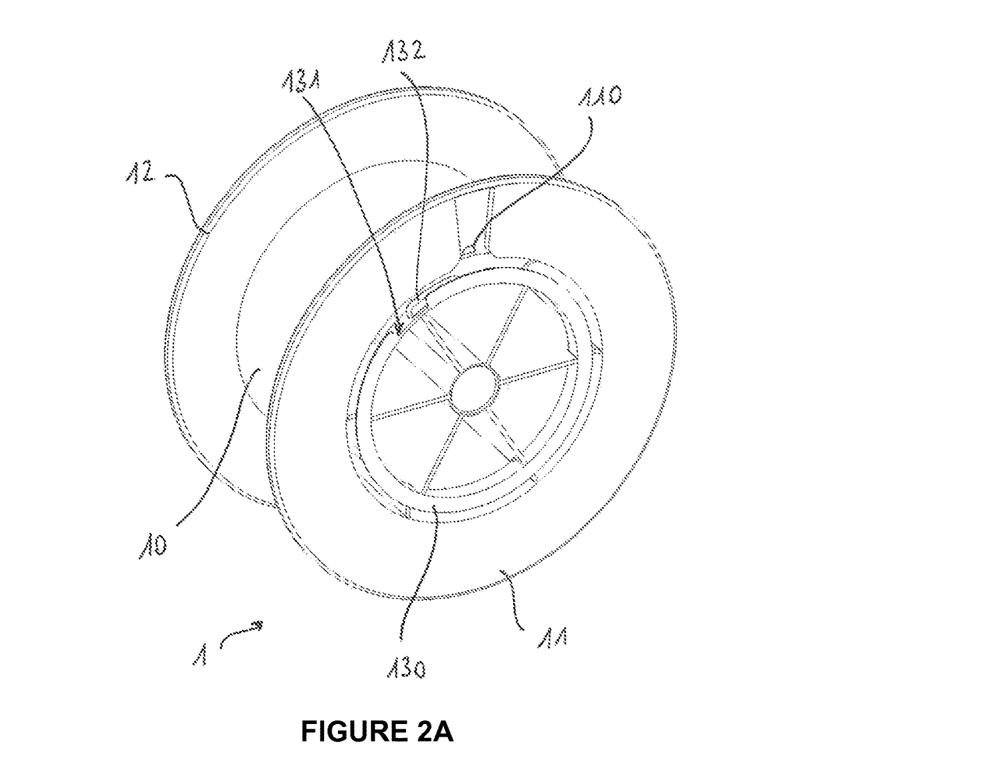
FIG. 2A is a perspective view of a bobbin that conforms with the invention.
Figure 2B:
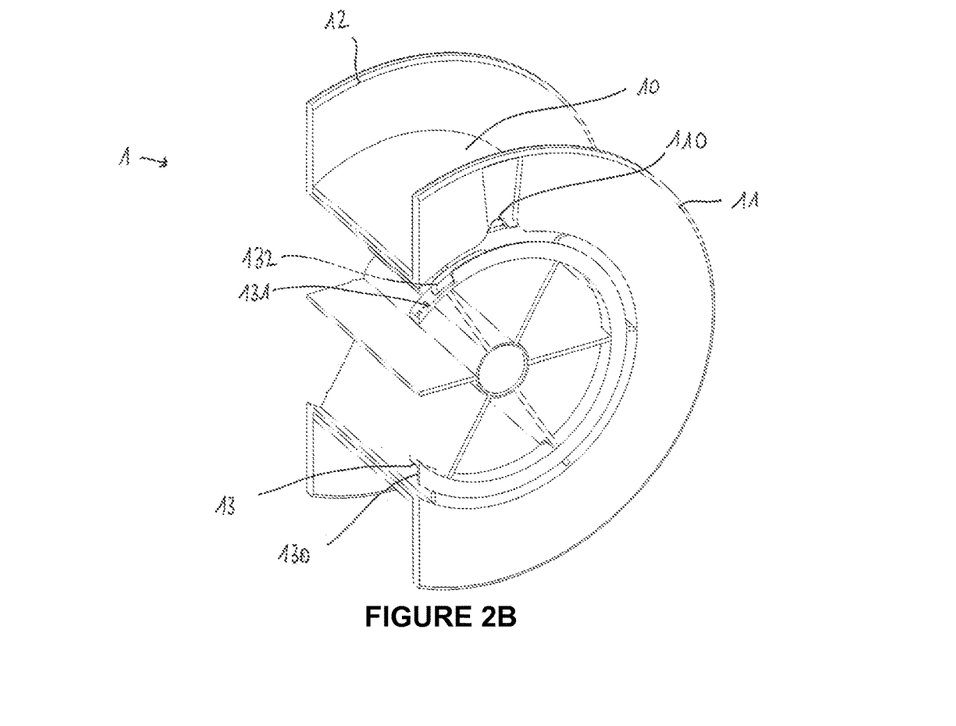
FIG. 2B is a partial cross-section view of the bobbin in FIG. 2A.

FIGS. 2A and 2B are perspective views of a bobbin according to an embodiment of the invention.

The bobbin 1 comprises a cylindrical reel 10 intended to receive the wound optical fibre. On both sides of the reel, two rims 11, 12 extend radially, intended to retain the optical fibre in the axial direction.

The rim 11 is provided with a port 110 for passing the optical fibre. The dimensions of such a port are typically a few millimetres. The port 110 is preferably arranged in the rim in the vicinity of the reel 10.

A magazine 13 that has a cylindrical surface intended to receive the excess length of the wound fibre is arranged in the bobbin by being separated from the reel 10 by the rim 11.

For example, as illustrated in FIG. 2B, the magazine 13 has a diameter less than that of the reel 10, while being coaxial with it, and is therefore located at a radial distance from the axis of the bobbin, less than that of the reel.

Moreover, the magazine 13 has a circumferential edge 130, wherein an opening 131 is arranged. As explained in detail below, this opening 131 allows the end of the excess length of optical fibre to come out of the magazine.

The opening 131 extends over a limited angular area, typically less than 90°, preferably between 10 and 20°.

Advantageously, the rim 11 and the edge 130 extend in one same plane.

The magazine 13 further comprises a radial rib 132 which extends from the cylindrical surface, transversally to the rotation axis of the bobbin. Said rib is located axially set back from the opening 131 (in other words, on the internal side of the bobbin) and is partially facing said opening 131. By "partially facing", it is meant that the angular sectors along which the rib 132 and the opening 131 extend are offset from each other, so as to only be partially covered. For a reverse winding direction, the opening 131 can be symmetrically extended in relation to the rib 132.

In the axial direction, the interval between the edge 130 and the rib 132 is defined depending on the diameter of the fibre, so as to maintain it and represents a length of between 100 μm and 400 μm. This interval is designed to let the last winding turn pass from the excess length. Thus, the corresponding section of fibre is wedged between the edge and the rib, which prevents any unintentional unwinding, without it being necessary to resort to an adhesive or another added attachment means.

The magazine 13 can form an integral part of the reel and the rims, the bobbin thus being in one piece. Alternatively, the magazine can be presented in the form of a separate piece which is then connected onto the reel and/or the rims.

The elements of the bobbin can be made from any material that is appropriate to this use, such as a plastic material, for example.

Figure 3A:
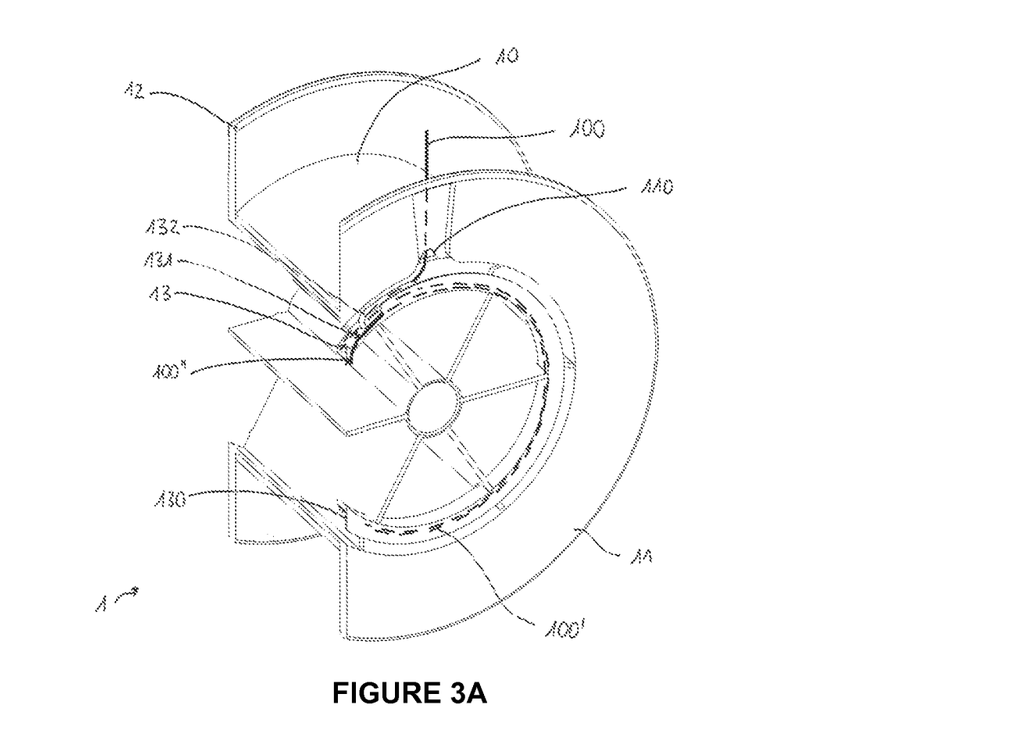
FIG. 3A is a perspective view of the bobbin in FIGS. 2A and 2B with the excess length of optical fibre wound onto the magazine.

FIG. 3A is a partial cross-section view of the bobbin in FIGS. 2A and 2B with the excess length 100' of optical fibre wound onto the magazine.

Figure 3B:
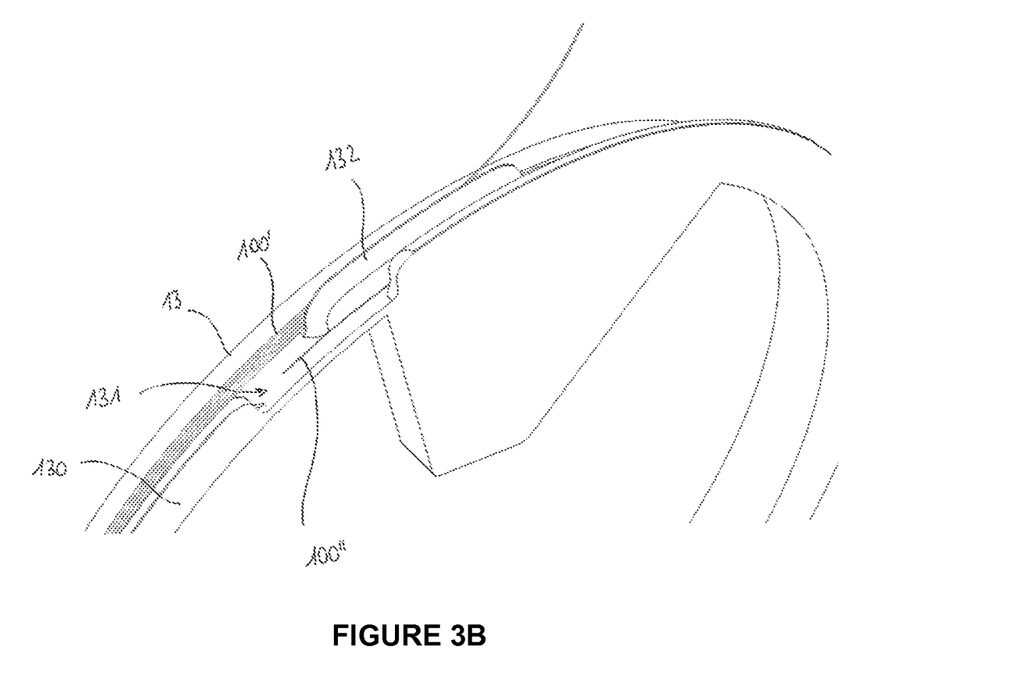
FIG. 3B is an enlargement of FIG. 3A at the level of the opening in the circumferential edge of the magazine.

As can be best seen in FIG. 3B, the main part of the excess length 100' of optical fibre is wound behind the rib 132 (in other words, on the internal side of the bobbin in relation to said rib); only the last turn of the winding is wedged between the rib 132 and the edge 130.

The end 100" of the optical fibre exits from the magazine by the opening 131 and is thus easily accessible in view of it being removed later.

Thus, to use the excess length 100' of optical fibre stored on the magazine 13, all is needed to be done is to pull on the end 100" and to unwind the excess length in the direction opposite to the winding, in order to remove a portion of it to test.

Now, the different steps of an automatic winding of the excess length of optical fibre onto said bobbin will be described, as well as an automated device allowing this method to be implemented.

This automated device is installed in a machine for placing an optical fibre in the bobbin. Apart from the automated device for winding the excess length of optical fibre, the machine in itself is known, and will therefore not be described in detail in this text.

The machine comprises a device for holding the bobbin, designed to maintain the bobbin by its central part in a determined position relative to means for moving an optical fibre along. In the machine, the bobbin is positioned relative to the optical fibre so that the fibre comes to the side of the reel, perpendicularly to it.

Particularly advantageously, the machine comprises means for guiding the optical fibre towards the port 110.

During the implementation of the steps for winding the excess length of optical fibre defined in reference to FIGS. 4A to 4D, the bobbin remains fixed. Preferably, the bobbin is positioned in the machine so that the port 110 and the opening 131 in the circumferential edge of the magazine are in a known position which can be reproduced from one bobbin to another. The bobbin can be provided for this purpose with centering and/or keying elements (not represented).

The bobbin is only represented partially in FIGS. 4A to 4D, where only the rim 11 and a part of the reel 10 are visible.

Figure 4A:
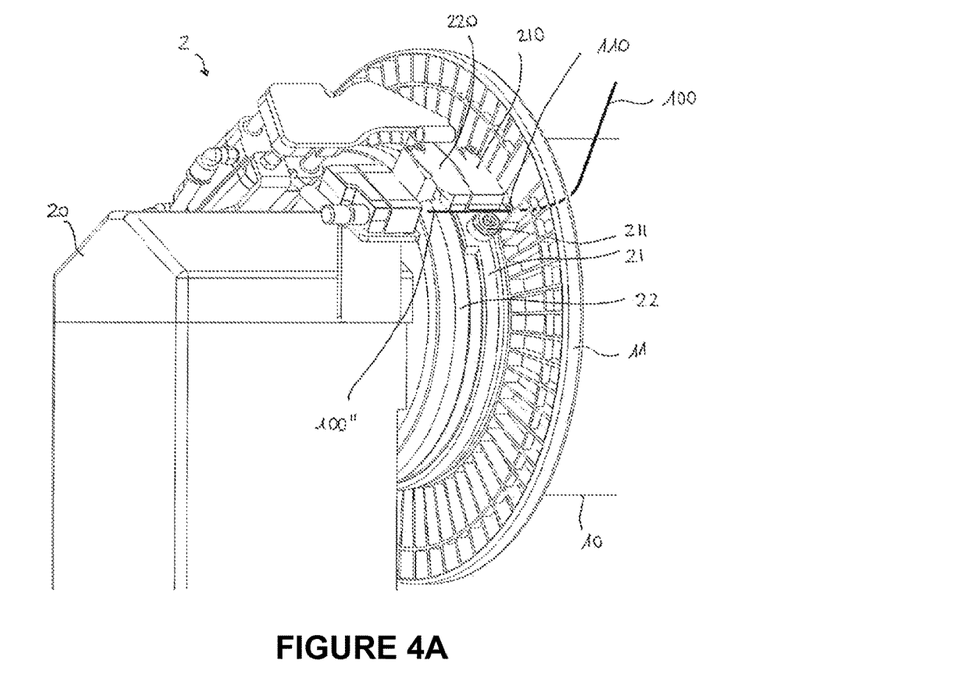
FIGS. 4A to 4D illustrate the steps of the method for the automatic winding of an excess length of optical fibre onto the magazine.

FIG. 4A illustrates a first step of the method, wherein the end 100" of the optical fibre 100 is inserted through the port 110 of the rim 11, the direction of insertion being from the reel 10 towards the magazine.

The device 2 for the automated winding of the excess length of optical fibre comprises means for temporarily storing the optical fibre in an area located on the side of the rim 11, opposite to the reel 10 and means for winding the optical fibre about the cylindrical surface of the magazine. Thus, the device implements a sequence of storing the optical fibre outside of the bobbin, followed by a winding of the optical fibre onto the magazine, so that from the winding step, the free end of the optical fibre is located on the external part of the winding (in other words, on the side opposite to the cylindrical surface). Thus, removing a section of optical fibre later is particularly easy, without risk of damaging the fibre.

According to an advantageous embodiment, the device 2 comprises two coaxial discs 21 and 22.

As will be seen in detail below, the disc 21 serves to wind the optical fibre onto the magazine, whereas the disc 22 serves to temporarily store the excess length 100'. Said discs are supported by a robotic arm 20 and have a rotation axis coincident with the one of the bobbin 1.

Possibly, the disc 22 could be replaced by any other means allowing the optical fibre to be temporarily stored, this storage could be linear or circular in a plane distinct from that of the disc 21.

The discs 21, 22 are adjacent, a unit could be provided between said discs to allow them to turn without rubbing on each other.

At the start of the process, the robotic arm 20 brings the disc 21 against the magazine and the rim 11.

The radius of the discs 21, 22 is substantially equal to the distance between the axis of the bobbin and the port 110 arranged in the rim 11. Thus, when the optical fibre is inserted through the port 110, it comes substantially flush to the circumferential surface of the discs 21, 22.

The discs 21, 22 each have a respective rotation drive device (not represented as internal to the arm 20), so that the discs 21, 22 can be rotated independently of each other, in the same direction or in opposite directions, at the same speed or at different speeds.

Each disc 21, 22 is provided with means for respectively clamping an end 100" of the optical fibre against the circumferential surface of the disc.

Said clamping means can comprising a finger 210, respectively 220, able to pivot between an elevated position where the finger is distant from the circumferential surface of the disc and a lowered position where the finger is contacting the circumferential surface of the disc, so as to clamp a section of fibre passing between the finger and the surface.

The disc 21, which is the closest disc to the bobbin 1, has on its circumferential surface, a guiding pad 211 arranged facing the clamping finger 210. This guiding pad 211 typically has a cylindrical form and thus serves as a support surface to the fibre over an angular area of 90° between the port 110 and the circumferential surface of the disc 21, whereon it has to be wound (see FIG. 4B).

The robotic arm advantageously comprises means for aligning the fingers 210, 220 in relation to the port 110. These alignment means can, in particular, comprise a position sensor for each one of the discs and a control system, configured to activate the means for rotating the discs 21, 22 into the required position in relation to the port 110.

Figure 4B:
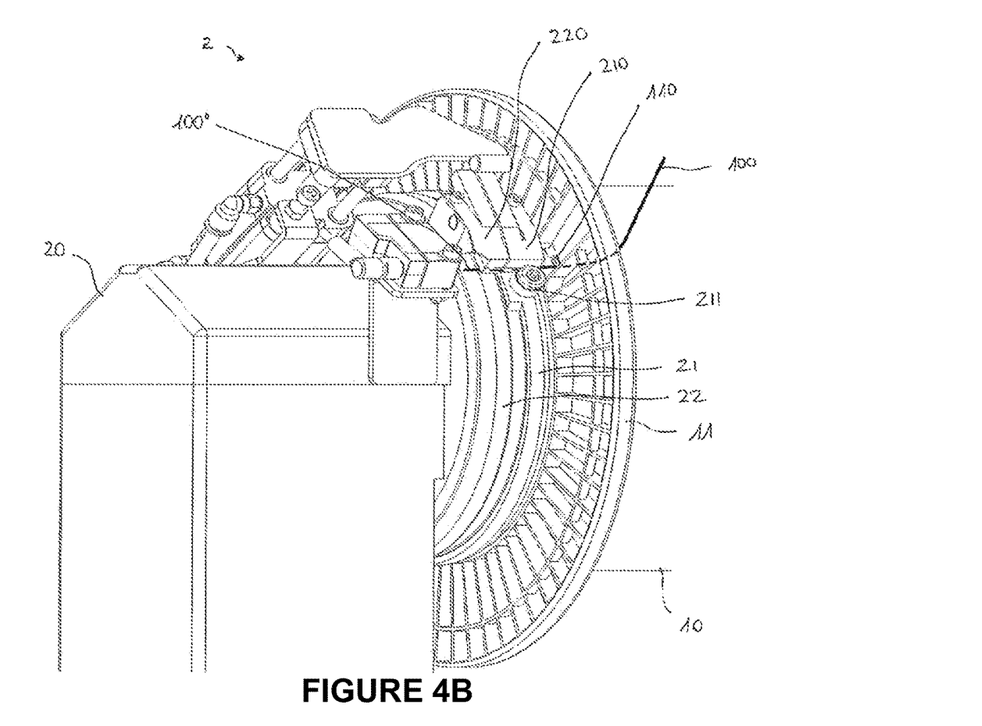

FIG. 4B illustrates a second step of the process, wherein, having inserted the end 100" of the optical fibre through the port 110, the clamping means are activated so as to clamp the end 100" of the optical fibre between the fingers 210, 220 and the circumferential surface of the discs 21, 22. The finger 220 holds the end of the optical fibre when the disc 22 is rotating. The finger 210 exerts a slight pressure allowing the optical fibre to be stretched when being wound.

Figure 4C:
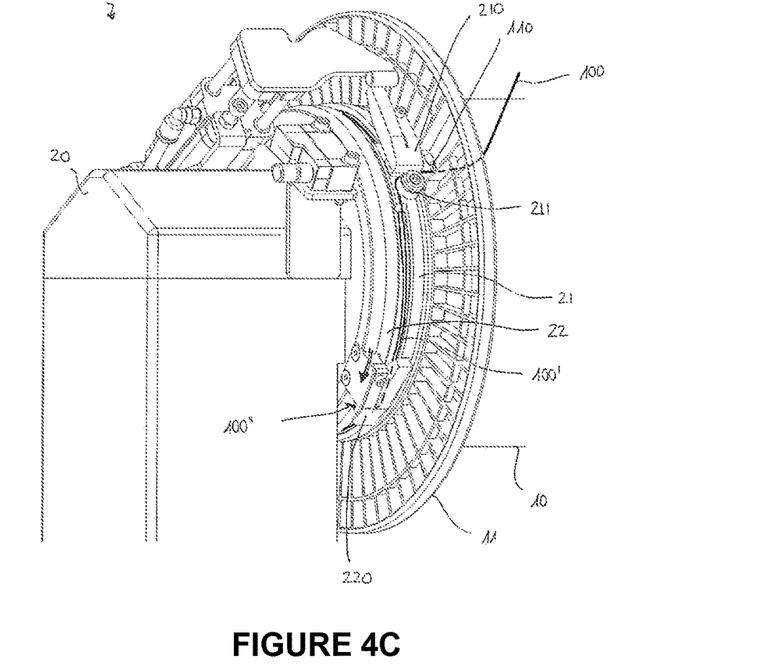

In reference to FIG. 4C, the disc 22 is then rotated, which is the disc that is the most distant from the bobbin. The rotational direction is indicated by the double arrow.

The end 100" of the optical fibre being connected to the rotating disc 22, the excess length 100' of optical fibre is progressively wound onto the circumferential surface of the disc 22. The disc 21 remains fixed during this step of the process.

The number of turns made by the disc 22 substantially corresponds to the length of the excess length of optical fibre to be wound onto the magazine.

Once the number of required turns has been made, the rotation of the disc 22 is stopped and the disc 21 is rotated in the direction (indicated by the double arrow in FIG. 4C) opposite to the direction wherein the disc 22 turned beforehand. In this step, the discs 21 and 22 turn in the same direction, but at different speeds, the disc 22 the most distant from the bobbin turning quicker than the disc 21, the closest to the bobbin. In this step, the excess length 100' of optical fibre which had been stored on the disc 22 in the preceding step is progressively wound onto the magazine 13, on the side of the rib 132 opposite to the circumferential edge 130.

Figure 4D:
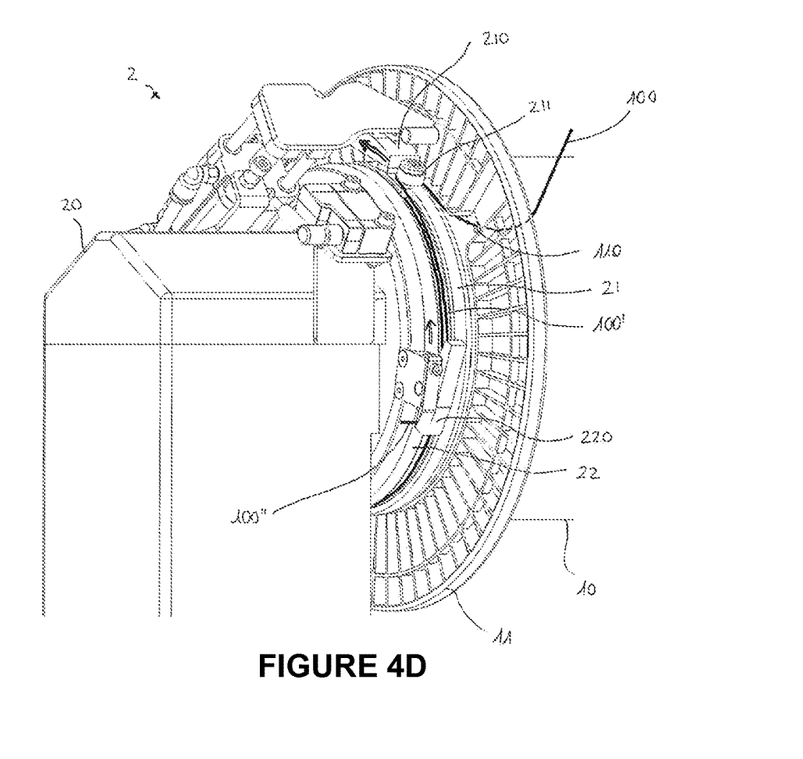

At the end of the penultimate winding turn, both the discs 21 and 22 are axially offset in the direction of distance opposite the bobbin. The offset distance substantially corresponds to the thickness of the rib 132, which has the effect of positioning the excess length of remaining optical fibre to be wound between the rib 132 and the circumferential edge 130 of the magazine.

The discs 21 and 22 thus make a last turn, keeping the same direction and the same rotating speed as before this offsetting.

The rotation of the discs is stopped when the end 100" of the optical fibre comes facing the opening 131, said end being retained between the rib 132 and the circumferential edge 130.

The arm 20 and the discs 21, 22 are thus distant from the bobbin.

Then the bobbin is rotated and the winding of the optical fibre onto the reel 10 starts, according to a conventional process.

The invention claimed is:
1. A device for winding an excess length of optical fiber onto a bobbin comprising:

means for storing said excess length of optical fiber; and
means for winding said excess length of optical fiber about a magazine of the bobbin, the bobbin including
a cylindrical reel; and
two rims extending radially from each end of the reel, one of the rims being provided with a port for the optical fiber, wherein the magazine of the bobbin has a cylindrical surface intended to receive at least one winding of said excess length of optical fiber, said magazine being separated from the reel by the rim provided with the port and having a circumferential edge for retaining said excess length of optical fiber,
wherein said storing and winding means is configured to cooperate to unwind a length of optical fiber stored on the storage means and to wind said excess length about the magazine.

2. The device according to claim 1, wherein said means for storing and means for winding comprise two coaxial adjacent discs, each disc comprising respective means for clamping the optical fiber, said device further comprising a robotic arm holding said discs and a device for respectively rotating each disc independently of the other disc.

3. The device according to claim 1, further comprising means for aligning the discs in relation to the port of the rim of the bobbin.

4. The device according to claim 1, further comprising a machine for placing the optical fiber in the bobbin.

5. A bobbin intended to wind an optical fiber, comprising:
a cylindrical reel configured to receive the optical fiber;
two rims extending radially from each end of the reel, one of the rims being provided with a port for the optical fiber; and
a magazine that has a cylindrical surface intended to receive a winding of an excess length of optical fiber, said magazine being separated from the reel by the rim provided with the port and having a circumferential edge for retaining said excess length of optical fiber, wherein said circumferential edge has an opening and the magazine has a rib extending radially over a part of the circumference of the cylindrical surface, set back and partially facing said opening, so as to hold a loop of the excess length of optical fiber between the circumferential edge and the rib.

6. The bobbin according to claim 5, wherein the distance between the circumferential edge and the rib is between 100 µm and 400 µm.

7. The bobbin according to claim 5, wherein the magazine is separate from the reel and connected to said reel.

8. The bobbin according to claim 5, wherein the whole of the reel, the rims and the magazine is constituted from one single piece.

9. The bobbin according to claim 5, further comprising an optical fiber wound onto the reel and an excess length of said optical fiber wound onto the cylindrical surface of the magazine, the end of said excess length extending between the rib and the circumferential edge and passing through the opening.

10. A method for winding an excess length of optical fiber onto a bobbin, comprising:
providing a bobbin, wherein the bobbin includes:
a cylindrical reel configured to receive the optical fiber,
two rims extending radially from each end of the reel, one of the rims being provided with a port for the optical fiber, and
a magazine that has a cylindrical surface intended to receive at least one winding of an excess length of optical fiber, said magazine being separated from the reel by the rim provided with the port and having a circumferential edge for retaining said excess length of optical fiber, wherein said circumferential edge has an opening and the magazine has a rib extending radially over a part of the circumference of the cylindrical surface, set back and partially facing said opening, so as to hold a loop of the excess length of optical fiber between the circumferential edge and the rib;
providing a winding device, wherein the winding device includes:
a first rotatable structure configured to store said excess length of optical fiber, and
second rotatable structure configured to wind said excess length of optical fiber about the magazine, wherein the first rotatable structure and the second rotatable structure are configured to cooperate to unwind a length of optical fiber stored on the first rotatable structure and to wind said excess length about the magazine;
positioning the winding device facing the bobbin;
inserting the optical fiber through the port of the reel towards the first rotatable structure;
storing the excess length of optical fiber on said first rotatable structure; and
winding, by the second rotatable structure, said excess length of optical fiber onto the cylindrical surface of the magazine, on the side of the rib, opposite to the circumferential edge, the last turn of said excess length being positioned between the rib and the circumferential edge.

11. The method according to claim 10, wherein said first rotatable structure and second rotatable structure comprise two coaxial adjacent discs, each disc comprising respective means for clamping the optical fiber, said winding device further comprising a robotic arm holding said discs and a device for respectively rotating each disc independently of the other disc.

12. The method according to claim 11, further comprising:
positioning the winding device facing the bobbin so that a first disc of the coaxial adjacent discs is adjacent to the magazine;
inserting the optical fiber through the port of the reel towards the discs;
clamping the end of the optical fiber against a second disc of the coaxial adjacent discs;
rotating said second disc in a first direction, the first disc remaining fixed in relation to the bobbin, so as to wind an excess length of optical fiber onto the second disc;
rotating the two discs in a second direction, opposite to the first direction, the second disc having a rotating speed greater than that of the first disc, so as to wind said excess length of optical fiber onto the cylindrical surface of the magazine, on the side of the rib opposite the circumferential edge;
before the winding of the last turn of said excess length, offsetting the two discs in a direction remote from the bobbin, so as to position the excess length of remaining optical fiber to be wound onto the magazine between the rib and the circumferential edge; and
further rotating the two discs, so as to wind the last turn of the excess length of optical fiber onto the magazine.

* * * * *